(12) United States Patent
Yu et al.

(10) Patent No.: US 11,041,589 B2
(45) Date of Patent: Jun. 22, 2021

(54) METHOD, APPARATUS AND SYSTEM FOR SAFETY CONTROL

(71) Applicant: Robert Bosch GmbH, Stuttgart (DE)

(72) Inventors: Huajun Yu, Shanghai (CN); Patrick Poa, Shanghai (CN); Mingliang Zhang, Shanghai (CN); Wei Wang, Shanghai (CN)

(73) Assignee: Robert Bosch GmbH, Stuttgart (DE)

(*) Notice: Subject to any disclaimer, the term of this patent is extended or adjusted under 35 U.S.C. 154(b) by 191 days.

(21) Appl. No.: 16/319,670

(22) PCT Filed: Jul. 25, 2016

(86) PCT No.: PCT/CN2016/091542
§ 371 (c)(1),
(2) Date: Jan. 22, 2019

(87) PCT Pub. No.: WO2018/018360
PCT Pub. Date: Feb. 1, 2018

(65) Prior Publication Data
US 2020/0372734 A1 Nov. 26, 2020

(51) Int. Cl.
*F16P 3/14* (2006.01)
*G07C 9/29* (2020.01)
(Continued)

(52) U.S. Cl.
CPC .......... *F16P 3/147* (2013.01); *G07C 9/00182* (2013.01); *G07C 9/29* (2020.01); *H04W 12/71* (2021.01)

(58) Field of Classification Search
CPC combination set(s) only.
See application file for complete search history.

(56) References Cited

U.S. PATENT DOCUMENTS

| 2008/0308322 A1* | 12/2008 | Augustyniak | G07C 9/15 177/1 |
| 2010/0117790 A1* | 5/2010 | Bayne | G07C 9/28 340/5.21 |
| 2013/0201286 A1* | 8/2013 | Schockmel | G08C 19/00 348/46 |

FOREIGN PATENT DOCUMENTS

| CN | 101248463 | 8/2008 |
| CN | 102099839 | 6/2011 |

(Continued)

OTHER PUBLICATIONS

International Search Report for Application No. PCT/CN2016/091542 dated May 4, 2017 (English Translation, 2 pages).

*Primary Examiner* — Thomas S McCormack
(74) *Attorney, Agent, or Firm* — Michael Best & Friedrich LLP (57) ABSTRACT

The present invention relates to a system, apparatus and method for safety control, the system comprising: a first device, which provides information capable of being used to determine whether a single staff member is present in a target area; a second device, which may be arranged at an entrance of a designated area, and used for controlling the entry of staff into the designated area; at least one sensing device, for detecting whether an activated transmitting unit, required to be carried by a staff member entering the designated area, is present in the target area; and a control device, for causing the second device to allow a staff member located in the target area to enter the designated area, when it is determined that a single staff member is present in the target area on the basis of the information from the first device and it is determined using the at least one sensing device that the activated transmitting unit is present in the target area. The system, apparatus and method can increase the safety of staff.

14 Claims, 3 Drawing Sheets

(51) Int. Cl.
*G07C 9/00* (2020.01)
*H04W 12/71* (2021.01)

(56) References Cited

FOREIGN PATENT DOCUMENTS

| | | |
|---|---|---|
| CN | 102622834 | 8/2012 |
| CN | 103247116 | 8/2013 |
| CN | 103348294 A | 10/2013 |
| EP | 1752702 | 2/2007 |
| EP | 2282106 A1 | 2/2011 |

* cited by examiner

METHOD, APPARATUS AND SYSTEM FOR SAFETY CONTROL

BACKGROUND OF THE INVENTION

The present invention relates to the field of safety control, in particular to a method, apparatus and system for safety control.

EP1752702A1 describes a solution for monitoring collisions between robots and staff. In that solution, a navigation system (NS) is used to continuously detect the positions of staff (P1-PN) in a restricted area (B), the positions of the staff in the restricted area are compared with the positions of restricted safe areas (SZ1-SZN) associated with each robot (R1-RN), and if a staff member approaches or enters a restricted safe area, a robot is lowered to a safe state or is shut down according to a pre-allocated safety parameter of the robot, thereby protecting the staff member from being harmed by the robot.

The solution disclosed in EP1752702A1 is able to to protect the staff member in the restricted area from being harmed by the robot because the staff member entering the restricted area is carrying a transmitting unit so that the staff member's position can be determined. However, EP1752702A1 does not disclose how to ensure that all staff entering the restricted area are carrying a transmitting unit; thus, the solution disclosed in EP1752702A1 has a safety risk.

SUMMARY OF THE INVENTION

An embodiment of the present invention provides a method, apparatus and system for safety control, which can increase the safety of staff.

A system for safety control according to an embodiment of the present invention comprises: a first device, which provides information capable of being used to determine whether a single staff member is present in a target area; a second device, which may be arranged at an entrance of a designated area, and used for controlling the entry of staff into the designated area; at least one sensing device, for detecting whether an activated transmitting unit, required to be carried by a staff member entering the designated area, is present in the target area; and a control device, for causing the second device to allow a staff member located in the target area to enter the designated area, when it is determined that a single staff member is present in the target area on the basis of the information from the first device and it is determined using the at least one sensing device that the activated transmitting unit is present in the target area.

The first device comprises a third device and/or a fourth device, wherein the third device is a device which, each time it is operated, only allows a single staff member to enter the target area, and the third device, when operated, outputs a signal for indicating that it has been operated, and the fourth device is used for acquiring data capable of indicating a number of staff present in the target area, and the fourth device outputs a signal containing the data, wherein when the first device comprises the third device or the fourth device, the information is the signal outputted by the third device or the signal outputted by the fourth device; when the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area.

The third device is a revolving door, and the fourth device is a pressure-sensitive mat.

The at least one sensing device is one sensing device, arranged so as to be only capable of receiving a signal transmitted by an activated transmitting unit present in the target area, or the at least one sensing device is multiple sensing devices arranged in the designated area.

The system further comprises: a fifth device, for closing the designated area such that staff can only enter the designated area through the entrance.

A method for safety control according to an embodiment of the present invention comprises: determining whether a single staff member is present in a target area and whether an activated transmitting unit, required to be carried by a staff member entering a designated area, is present in the target area; and allowing a staff member located in the target area to enter the designated area, when a determination result is positive.

The step of determining whether a single staff member is present in a target area and whether an activated transmitting unit, required to be carried by a staff member entering a designated area, is present in the target area, comprises: determining whether a single staff member is present in the target area on the basis of information capable of being used to determine whether a single staff member is present in the target area, the information coming from a first device; and determining whether the activated transmitting unit is present in the target area, using at least one sensing device for detecting whether the activated transmitting unit is present in the target area.

The first device comprises a third device and/or a fourth device, wherein the third device is a device which, each time it is operated, only allows a single staff member to enter the target area, and the third device, when operated, outputs a signal for indicating that it has been operated, to serve as the information, and the fourth device is used for acquiring data capable of indicating a number of staff present in the target area, and the fourth device outputs a signal containing the data, to serve as the information, wherein when the first device comprises the third device or the fourth device, the information is the signal outputted by the third device or the signal outputted by the fourth device, and when the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area.

The at least one sensing device is one sensing device, arranged so as to be only capable of sensing an activated transmitting unit located in the target area, or the at least one sensing device is multiple sensing devices arranged in the designated area.

An apparatus for safety control according to an embodiment of the present invention comprises: a determining module, for determining whether a single staff member is present in a target area and whether an activated transmitting unit, required to be carried by a staff member entering a designated area, is present in the target area; and a control module, for allowing a staff member located in the target area to enter the designated area, when a determination result is positive.

The determining module comprises: a first module, for determining whether a single staff member is present in the target area on the basis of information capable of being used to determine whether a single staff member is present in the target area, the information coming from a first device; and a second module, for determining whether the activated transmitting unit is present in the target area, using at least one sensing device for detecting whether the activated transmitting unit is present in the target area.

A control device according to an embodiment of the present invention comprises: a processor; and a memory, storing an executable instruction which, when executed, causes the processor to execute an operation included in the method described above.

A machine-readable storage medium according to an embodiment of the present invention has an executable instruction thereon; when the executable instruction is executed, a machine is caused to execute an operation included in the method described above.

It can be seen from the description above that in the solution provided in an embodiment of the present invention, a staff member is allowed to enter a corresponding area only when it is detected that the staff member is carrying an activated transmitting unit; thus, compared with the prior art, the solution in an embodiment of the present invention increases the safety of staff.

BRIEF DESCRIPTION OF THE DRAWINGS

Other features, characteristics, benefits and advantages of the present invention will become more obvious through the following detailed description which makes reference to the accompanying drawings, wherein.

DETAILED DESCRIPTION

Various embodiments of the present invention are described in detail below with reference to the accompanying drawings.

Figure 1:
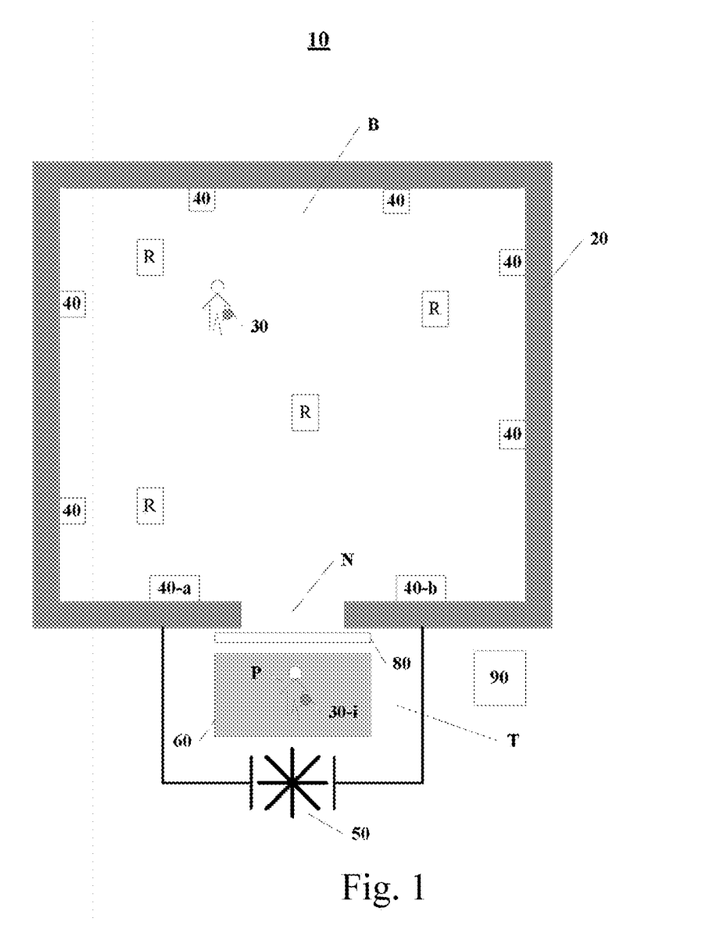
FIG. 1 shows a schematic architecture diagram of a system for monitoring collisions between robots and staff according to an embodiment of the present invention.

Reference is now made to FIG. 1, which shows a schematic architecture diagram of a system for monitoring collisions between robots and staff according to an embodiment of the present invention. The system 10 shown in FIG. 1 can monitor collisions between robots R and staff in a restricted area B; the restricted area B may for example be any area in which robots R participate in work.

As shown in FIG. 1, the system 10 may comprises a mechanical fence 20, an electronic tag 30, multiple tag readers 40, a revolving door 50, a pressure-sensitive mat 60, an electronic access control door 80 and a control device 90.

The mechanical fence 20 is arranged on a boundary of the restricted area B, such that the restricted area B is formed as a closed area having an entrance/exit N. Due to the presence of the mechanical fence 20, staff can only enter the restricted area B through the entrance/exit N and leave the restricted area B through the entrance/exit N.

The electronic tag 30 serves as a transmitting unit, and when activated, continuously transmits an ultra-wide band (UWB) signal. For safety reasons, each staff member entering the restricted area B must carry an activated electronic tag 30, so that the position of the staff member can be determined. The electronic tag 30 carried by any staff member who has not yet entered the restricted area B has not been logged onto the restricted area B, but the electronic tag 30 carried by each staff member who has already entered the restricted area B was logged onto the restricted area B when the restricted area B was entered. Thus, the electronic tag 30 carried by a staff member who has not yet entered the restricted area B is generally an electronic tag that has not yet been logged onto the restricted area B, but the electronic tag 30 carried by a staff member who has already entered the restricted area B is generally an electronic tag that has been logged onto the restricted area B.

The tag readers 40 are used for receiving the UWB signal transmitted by the electronic tag 30. The tag readers 40 included in the system 10 are arranged in a dispersed fashion in suitable positions in the restricted area B, so that regardless of which position the staff member carrying the electronic tag 30 walks to in the restricted area B, the UWB signal transmitted by the electronic tag 30 can be received by at least three tag readers 40, so that the position of the electronic tag 30 can be calculated on the basis of the positions of the at least three tag readers.

In addition, the positions of two tag readers 40-$a$ and 40-$b$ arranged in the restricted area B in the system 10 are suitably disposed, such that when an activated electronic tag 30 is present in an area T located outside the entrance/exit N of the restricted area B and close to the entrance/exit N, the UWB signal transmitted by the electronic tag 30 can be received, and can only be received, by the tag readers 40-$a$ and 40-$b$. Since the area T is located outside the restricted area B, staff entering the area T are generally staff who have not yet entered the restricted area B, and correspondingly, electronic tags 30 present in the area T are generally electronic tags carried by staff who have not yet entered the restricted area B; hence, electronic tags 30 present in the area T are generally electronic tags which have not yet been logged onto the restricted area B. Thus, when an activated electronic tag 30 is present in the area T, the tag readers 40-$a$ and 40-$b$ should both receive a UWB signal transmitted by an electronic tag which has not yet been logged onto the restricted area B, and when there is no activated electronic tag 30 present in the area T, the tag readers 40-$a$ and 40-$b$ should both not have received a UWB signal transmitted by an electronic tag which has not yet been logged onto the restricted area B. In such a situation, by checking whether the tag readers 40-$a$ and 40-$b$ have both received a UWB signal transmitted by an electronic tag which has not yet been logged onto the restricted area B, it is possible to determine whether an activated electronic tag 30 is present in the area T. Those skilled in the art should understand that although the two tag readers 40-$a$ and 40-$b$ arranged in the restricted area B in the system 10 are used to detect whether an activated electronic tag 30 is present in the area T in this embodiment, the present invention is not restricted to this. In other embodiments of the present invention, more than two tag readers arranged in the restricted area B in the system 10 could also be used to detect whether an activated electronic tag 30 is present in the area T.

The revolving door 50 is arranged close to the entrance/exit N of the restricted area B. Each operation of the revolving door 50 only allows a single staff member to enter the area T. On each occasion that the revolving door 50 is operated once, the revolving door 50 outputs to the control device 90 a signal for indicating that it has been operated. Thus, once the revolving door 50 has outputted to the control device 90 a signal for indicating that it has been operated, this shows that a single staff member, and only a single staff member, has entered the area T. Hence, the signal for indicating that the revolving door 50 has been operated can serve as information for determining whether a single staff member is present in the area T.

The pressure-sensitive mat 60 is a pressure sensor, which is arranged on a floor of the area T, and used for sensing a pressure applied to the area T and outputting to the control device 90 a signal containing the sensed pressure. The number of staff present in the area T can be detected on the basis of the pressure sensed by the pressure-sensitive mat 60. For example, if the pressure contained in the signal falls within a designated pressure range (e.g. 60-100 kg) for indicating a single staff member's weight, this indicates that the number of staff present in the area T is 1. If the pressure contained in the signal is less than a lower limit of the designated pressure range, this indicates that the number of staff present in the area T is zero. If the pressure contained in the signal is more than an upper limit of the designated pressure range, this indicates that the number of staff present in the area T is greater than 1. Clearly, the pressure sensed by the pressure-sensitive mat 60 may be used to determine whether a single staff member is present in the area T. It can be seen from the above description that the pressure sensed by the pressure-sensitive mat 60 is data capable of indicating the number of staff present in the area T, and the signal containing the sensed pressure and outputted by the pressure-sensitive mat 60 can serve as information for determining whether a single staff member is present in the area T.

The electronic access control door 80 is arranged at the entrance/exit N of the restricted area B, and may be used to control the entry of staff into, and the exit of staff from, the restricted area B.

The control device 90 may be connected to the tag readers 40, the revolving door 50, the pressure-sensitive mat 60, the tag reader 70 and the electronic access control door 80. In addition, position information of the robots R and position information of the tag readers 40 in the restricted area B are also pre-stored in the control device 90.

An operating process of a UWB real-time positioning system 10 is described in specific terms below.

The control device 90 controls the revolving door 50 to be in a state allowing staff operation. When any staff member P wishes to enter the restricted area B, the staff member P can operate the revolving door 50 to enter the area T, on the floor of which is arranged the pressure-sensitive mat 60. When the revolving door 50 has been operated by the staff member P, the revolving door 50 outputs to the control device 90 a signal for indicating that it has been operated. After receiving from the revolving door 50 the signal for indicating that it has been operated, the control device 90 locks the revolving door 50 so that it is in a state prohibiting staff operation.

In addition, the pressure-sensitive mat 60 also outputs to the control device 90 a signal containing a sensed pressure. Each operation of the revolving door 50 only allows a single staff member to enter the area T; therefore, once the staff member P has operated the revolving door 50 and entered the area T, only the staff member P is present in the area T. In such a situation, the pressure contained in the signal outputted by the pressure-sensitive mat 60 will fall within the designated pressure range indicating a single staff member's weight, hence the signal containing the pressure and outputted by the pressure-sensitive mat 60 will show that a single staff member is present in the area T.

The control device 90 determines whether a single staff member is present in the area T on the basis of the signal from the revolving door 50 and the signal of the pressure-sensitive mat 60. As described above, the signal outputted by the revolving door 50 for indicating that it has been operated does itself show that a single staff member is present in the area T, and the signal containing the pressure and outputted by the pressure-sensitive mat 60 also shows that a single staff member is present in the area T. Since the signals outputted by the revolving door 50 and outputted by the pressure-sensitive mat 60 both show that a single staff member is present in the area T, the control device 90 determines that a single staff member is present in the area T.

In addition, the control device 90 determines whether an activated electronic tag 30 is present in the area T, by detecting whether the tag readers 40-*a* and 40-*b* have both received a UWB signal transmitted by an electronic tag which has not yet been logged onto the restricted area B. As described above, if the staff member P entering the area T is carrying an activated electronic tag 30, then the tag readers 40-*a* and 40-*b* will both receive a UWB signal transmitted by an electronic tag which has not yet been logged onto the restricted area B, but if the staff member P entering the area T is not carrying any activated electronic tag 30, then the tag readers 40-*a* and 40-*b* will both not receive a UWB signal transmitted by an electronic tag which has not yet been logged onto the restricted area B. Hence, by detecting whether the tag readers 40-*a* and 40-*b* have both received a UWB signal transmitted by an electronic tag which has not yet been logged onto the restricted area B, it is possible to determine whether an activated electronic tag 30 is present in the area T. Here, supposing that the staff member P entering the area T is carrying an activated electronic tag 30-*i*, then the control device 90 determines that the activated electronic tag 30-*i* is present in the area T.

Since it is determined that the single staff member and the activated electronic tag 30-*i* are present in the area T, the control device 90 logs the activated electronic tag 30-*i* present in the area T onto the restricted area B, and impels the electronic access control door 80 to open so that it allows the staff member P in the area T to enter the restricted area B.

After the staff member P has entered the restricted area B through the entrance/exit N, the control device 90 controls the revolving door 50 to be in a state allowing staff operation, and continuously detects position information of the staff member P on the basis of position information of the tag readers 40 receiving the UWB signal transmitted by the electronic tag 30-*i* in the restricted area B, and compares the detected position information of the staff member P with pre-stored position information of the robots R in the restricted area B. If a comparison result shows that a distance between the staff member P and a robot in the restricted area B is less than a predetermined safe distance, then in order to prevent the staff member P from being harmed, the control device 90 controls the robot to be lowered to a safe state, for example but without limitation, slows down an action of the robot or shuts down the robot.

If the electronic tag 30-*i* carried by the staff member P has developed a fault and is unable to transmit a UWB signal, then the control device 90 will detect that all the tag readers 40 in the restricted area B have not received a UWB signal transmitted by the electronic tag 30-$i$; hence, the control device 90 determines that the electronic tag 30-$i$ has developed a fault. In such a situation, the control device 90 shuts down all the robots in the restricted area B to avoid harming the staff member P.

After walking to a position in the restricted area B, if the staff member P inadvertently or intentionally removes the electronic tag 30-$i$, then the electronic tag 30-$i$ will trigger a signal for indicating electronic tag removal. The control device 90 receives the signal sent by the electronic tag 30-$i$ for indicating electronic tag removal, via a tag reader 40 close to the position, and then the control device 90 shuts down a robot close to the position in the restricted area B to avoid harming the staff member P.

If the staff member P walks to the entrance/exit N of the restricted area B and uses the electronic tag 30-$i$ to open the electronic access control door 80 and leaves the restricted area B, then the control device 90 logs the electronic tag 30-$i$ out of the restricted area B.

It can be seen from the above description that in this embodiment, the mechanical fence 20, the revolving door 50, the pressure-sensitive mat 60, the tag readers 40-$a$ and 40-$b$, the electronic access control door 80 and the control device 90 can together form a safety control system, wherein the mechanical fence 20 causes the restricted area B to become a closed area having an entrance/exit, and the revolving door 50, the pressure-sensitive mat 60, the tag readers 40-$a$ and 40-$b$, the electronic access control door 80 and the control device 90 operate in a coordinated manner such that only staff members carrying activated electronic tags can enter the restricted area B through the entrance/exit. Hence, the solution in this embodiment ensures that all staff entering the restricted area are carrying activated electronic tags so that the positions thereof can be detected, thereby increasing the safety of staff.

Those skilled in the art will understand that although, in the embodiment above, the tag readers and electronic tags use UWB wireless communication technology for operation, the present invention is not limited to this. In other embodiments of the present invention, tag readers and electronic tags could also use another suitable wireless communication technology for operation.

Those skilled in the art will understand that although, in the embodiment above, the system 10 uses the pressure-sensitive mat 60 to acquire data capable of indicating the number of staff present in the area T, so as to determine whether a single staff member is present in the area T on the basis of the data, the present invention is not limited to this. In other embodiments of the present invention, another suitable device could also be used to acquire data capable of indicating the number of staff present in the area T, for example but without limitation, an infrared detection device, a human face detection device or a moving target detection device, etc.

Those skilled in the art will understand that although, in the embodiment above, the system 10 comprises the revolving door 50 and the pressure-sensitive mat 60, and the control device 90 determines that a single staff member is present in the area T only when the signals outputted by the revolving door 50 and the pressure-sensitive mat 60 both show that a single staff member is present in the area T, the present invention is not limited to this. In other embodiments of the present invention, it is also possible for the system 10 to comprise only the revolving door 50 or the pressure-sensitive mat 60, and when the signal outputted by the revolving door 50 or the signal outputted by the pressure-sensitive mat 60 shows that a single staff member is present in the area T, the control device 90 determines that a single staff member is present in the area T.

Those skilled in the art will understand that although, in the embodiment above, the system 10 uses the tag readers arranged in the restricted area B to determine whether an activated electronic tag is present in the area T, the present invention is not limited to this. In other embodiments of the present invention, it is also possible for the system 10 to not use tag readers arranged in the restricted area B to determine whether an activated electronic tag is present in the area T; as an alternative, the system 10 may additionally comprise at least one tag reader Q connected in a wireless or wired manner to the control device 90, for the purpose of detecting whether an activated electronic tag is present in the area T. The tag reader Q is arranged so as to be capable, and only capable, of receiving a signal transmitted by an activated electronic tag present in the area T. In such a situation, the control device 90 can determine whether an activated electronic tag is present in the area T by detecting whether the tag reader Q has received a signal transmitted by an electronic tag.

Those skilled in the art will understand that although, in the embodiment above, the transmitting unit is an electronic tag, the present invention is not limited to this. In other embodiments of the present invention, the transmitting unit could also be a device having a signal transmitting function, other than an electronic tag.

Those skilled in the art will understand that although, in the embodiment above, the tag reader is used as a sensing device to receive a signal transmitted by the transmitting unit, the present invention is not limited to this. In other embodiments of the present invention, the sensing device could also be a suitable device capable of receiving a signal transmitted by the transmitting unit, other than a tag reader.

Those skilled in the art will understand that although, in the embodiment above, the mechanical fence 20 is used to cause the restricted area B to become a closed area, the present invention is not limited to this. In other embodiments of the present invention, a suitable device other than the mechanical fence 20 could also be used to cause the restricted area B to become a closed area.

Those skilled in the art will understand that although, in the embodiment above, the system 10 comprises a mechanical fence 20 or another suitable device to cause the restricted area B to become a closed area, the present invention is not limited to this. In other embodiments of the present invention, for example if the restricted area B is itself a closed area, then the system 10 may not include the mechanical fence 20 or the other suitable device.

Those skilled in the art will understand that although, in the embodiment above, the revolving door 50 is used to ensure that only a single staff member is allowed to enter the area T each time, the present invention is not limited to this. In other embodiments of the present invention, a suitable device other than the revolving door 50 could also be used to ensure that only a single staff member is allowed to enter the area T each time.

Those skilled in the art will understand that although, in the embodiment above, the electronic access control door 80 is used to control the entry of staff into the restricted area B, the present invention is not limited to this. In other embodiments of the present invention, a suitable device other than the electronic access control door 80 could also be used to control the entry of staff into the restricted area B.

Those skilled in the art will understand that although, in the embodiment above, the entrance and exit of the restricted area B are the same opening, i.e. the entrance/exit N, the present invention is not limited to this. In other embodiments of the present invention, the entrance and exit of the restricted area B may be different openings. In the case where the entrance and exit of the restricted area B are different openings, the revolving door 50 is arranged close to the entrance of the restricted area B, and the electronic access control door 80 is arranged at the entrance of the restricted area B.

Figure 2:
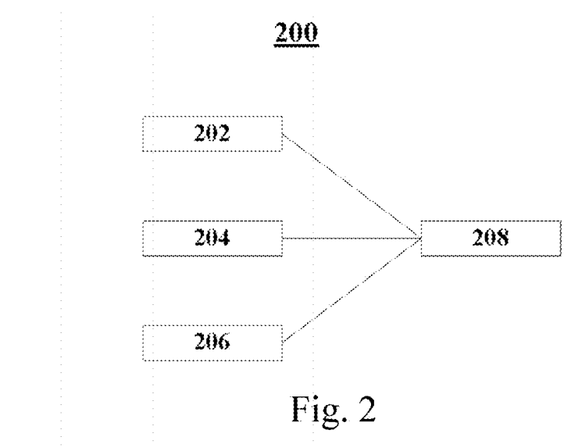
FIG. 2 shows a schematic diagram of a system for safety control according to an embodiment of the present invention.

FIG. 2 shows a schematic diagram of a system for safety control according to an embodiment of the present invention. As shown in FIG. 2, the system 200 for safety control may comprise a first device 202, which provides information capable of being used to determine whether a single staff member is present in a target area.

The system 200 may also comprise a second device 204, which may be arranged at an entrance of a designated area, and used for controlling the entry of staff into the designated area. The second device 204, for example but without limitation, may be the electronic access control door 80.

The system 200 may also comprise at least one sensing device 206, for detecting whether an activated transmitting unit, required to be carried by a staff member entering the designated area, is present in the target area.

The system 200 may also comprise a control device 208, for causing the second device 204 to allow a staff member located in the target area to enter the designated area, when it is determined that a single staff member is present in the target area on the basis of the information from the first device 202 and it is determined using the at least one sensing device 206 that the activated transmitting unit is present in the target area. The control device 208, for example but without limitation, may be the control device 90.

In one aspect, the first device 202 may comprise a third device and/or a fourth device. The third device may be a device which, each time it is operated, only allows a single staff member to enter the target area, and the third device, when operated, outputs a signal for indicating that it has been operated. The fourth device is used for acquiring data capable of indicating the number of staff present in the target area, and the fourth device outputs a signal containing the data. When the first device comprises the third device or the fourth device, the information is the signal outputted by the third device or the signal outputted by the fourth device. When the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area.

In another aspect, the third device may for example be the revolving door 50, and the fourth device may for example be the pressure-sensitive mat 60.

In another aspect, the at least one sensing device 206 may be one sensing device (for example but without limitation the tag reader Q), which is arranged so as to be only capable of receiving a signal transmitted by an activated transmitting unit present in the target area. Alternatively, the at least one sensing device is multiple sensing devices arranged in the designated area (for example but without limitation the tag readers 40-a and 40-b).

In another aspect, the system 10 may also comprise a fifth device, for closing the designated area such that staff can only enter the designated area through the entrance. The fifth device for example but without limitation.

Figure 3:
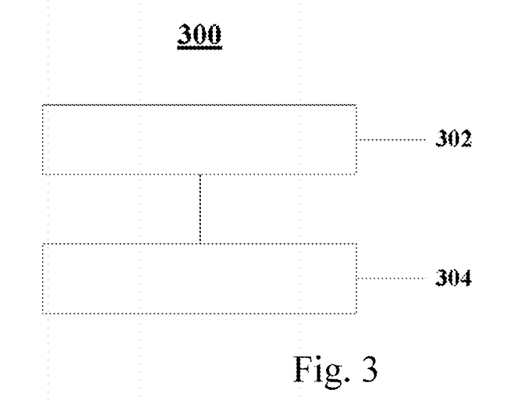
FIG. 3 shows a schematic diagram of a method for safety control according to an embodiment of the present invention.

FIG. 3 shows a schematic diagram of a method for safety control according to an embodiment of the present invention. The method 300 shown in FIG. 3 for example may be executed by the control device 90 or 208.

As shown in FIG. 3, the method 300 may comprise, in box 302, determining whether a single staff member is present in a target area and whether an activated transmitting unit, required to be carried by a staff member entering a designated area, is present in the target area.

The method 300 may also comprise, in box 304, allowing a staff member located in the target area to enter the designated area, when a determination result of box 302 is positive.

In one aspect, box 302 may comprise: determining whether a single staff member is present in the target area on the basis of information capable of being used to determine whether a single staff member is present in the target area, the information coming from a first device; and determining whether the activated transmitting unit is present in the target area, using at least one sensing device for detecting whether the activated transmitting unit is present in the target area.

In another aspect, the first device comprises a third device and/or a fourth device. The third device is a device which, each time it is operated, only allows a single staff member to enter the target area, and the third device, when operated, outputs a signal for indicating that it has been operated. The fourth device is used for acquiring data capable of indicating the number of staff present in the target area, and the fourth device outputs a signal containing the data. When the first device comprises the third device or the fourth device, the information is the signal outputted by the third device or the signal outputted by the fourth device. When the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area. The third device, for example but without limitation, may be the revolving door 50, and the fourth device, for example but without limitation, may be the pressure-sensitive mat 60.

In another aspect, the at least one sensing device is one sensing device (for example but without limitation the tag reader Q), which is arranged so as to be only capable of sensing an activated transmitting unit located in the target area. Alternatively, the at least one sensing device is multiple sensing devices arranged in the designated area (for example but without limitation the tag readers 40-a and 40-b).

Figure 4:
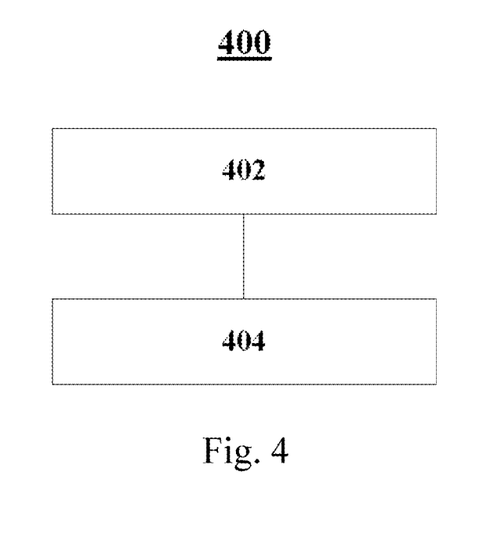
FIG. 4 shows a schematic diagram of an apparatus for safety control according to an embodiment of the present invention.

FIG. 4 shows a schematic diagram of an apparatus for safety control according to an embodiment of the present invention. The apparatus 400 shown in FIG. 4 may be implemented using software, hardware, or a combination of software and hardware. The apparatus 400 shown in FIG. 4 may for example be installed in the control device 90 or 208.

As shown in FIG. 4, the apparatus 400 may comprise a determining module 402 and a control module 404. The determining module 402 may be used for determining whether a single staff member is present in a target area and whether an activated transmitting unit, required to be carried by a staff member entering a designated area, is present in the target area. The control module 404 may be used for allowing a staff member located in the target area to enter the designated area, when a determination result of the determining module 402 is positive.

In one aspect, the determining module 402 may comprise a first module and a second module. The first module may be used for determining whether a single staff member is present in the target area on the basis of information capable of being used to determine whether a single staff member is present in the target area, the information coming from a first device. The second module may be used for determining whether the activated transmitting unit is present in the target area, using at least one sensing device for detecting whether the activated transmitting unit is present in the target area.

In another aspect, the first device comprises a third device and/or a fourth device. The third device is a device which, each time it is operated, only allows a single staff member to enter the target area, and the third device, when operated, outputs a signal for indicating that it has been operated. The fourth device is used for acquiring data capable of indicating the number of staff present in the target area, and the fourth device outputs a signal containing the data. When the first device comprises the third device or the fourth device, the information is the signal outputted by the third device or the signal outputted by the fourth device. When the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area. The third device, for example but without limitation, may be the revolving door 50, and the fourth device, for example but without limitation, may be the pressure-sensitive mat 60.

In another aspect, the at least one sensing device is one sensing device (for example but without limitation the tag reader Q), which is arranged so as to be only capable of sensing an activated transmitting unit located in the target area. Alternatively, the at least one sensing device is multiple sensing devices arranged in the designated area (for example but without limitation the tag readers 40-*a* and 40-*b*).

Figure 5:
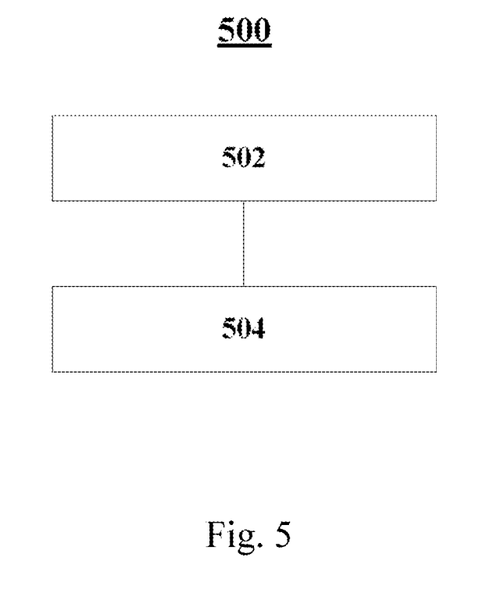
FIG. 5 shows a schematic diagram of a control device according to an embodiment of the present invention.

FIG. 5 shows a schematic diagram of a control device according to an embodiment of the present invention. As shown in FIG. 5, the control device 500 may comprise a processor 502, and a memory 504 coupled to the processor 502. The memory 504 stores an executable instruction which, when executed, causes the processor 502 to execute an operation included in the method 300 described above.

An embodiment of the present invention also provides a machine-readable storage medium having an executable instruction thereon; when the executable instruction is executed, a machine is caused to execute an operation included in the method 300 described above.

Those skilled in the art should understand that various alterations, amendments and changes may be made to the embodiments disclosed above without deviating from the substance of the invention, and these alterations, amendments and changes should all fall within the scope of protection of the present invention. Thus, the scope of protection of the present invention is defined by the attached claims.

The invention claimed is:

1. A system for safety control, the system comprising:
a first device, including a pressure sensitive mat, which provides information to determine whether a single staff member is present in a target area;
a second device, configured to be positioned at an entrance of a designated area, and used for controlling the entry of staff into the designated area;
at least one sensing device, for detecting whether an activated transmitting unit, required to be carried by a staff member entering the designated area, is present in the target area; and
a control device, for causing the second device to allow a staff member located in the target area to enter the designated area, when it is determined that a single staff member is present in the target area on the basis of the information from the first device and it is determined using the at least one sensing device that the activated transmitting unit is present in the target area.

2. The system according to claim 1, wherein the first device comprises a third device,
wherein the third device is a device which, each time it is operated, only allows a single staff member to enter the target area, and the third device, when operated, outputs a signal for indicating that it has been operated.

3. The system according to claim 1, wherein
the at least one sensing device is one sensing device, arranged so as to be only capable of receiving a signal transmitted by an activated transmitting unit present in the target area,
or
the at least one sensing device is multiple sensing devices arranged in the designated area.

4. The system according to claim 1, further comprising:
a fifth device, for closing the designated area such that staff can only enter the designated area through the entrance.

5. A method for safety control, comprising:
determining whether a single staff member is present in a target area and whether an activated transmitting unit, required to be carried by a staff member entering a designated area, is present in the target area; and
allowing a staff member located in the target area to enter the designated area, when a determination result is positive.

6. The method according to claim 5, wherein the step of determining whether a single staff member is present in a target area and whether an activated transmitting unit, required to be carried by a staff member entering a designated area, is present in the target area, comprises:
determining whether a single staff member is present in the target area on the basis of information capable of being used to determine whether a single staff member is present in the target area, the information coming from a first device; and
determining whether the activated transmitting unit is present in the target area, using at least one sensing device for detecting whether the activated transmitting unit is present in the target area.

7. The method according to claim 6, wherein
the first device comprises a third device and/or a fourth device,
wherein the third device is a device which, each time it is operated, only allows a single staff member to enter the target area, and the third device, when operated, outputs a signal for indicating that it has been operated, and
the fourth device is used for acquiring data capable of indicating a number of staff present in the target area, and the fourth device outputs a signal containing the data, wherein when the first device comprises the third device or the fourth device, the information is the signal outputted by the third device or the signal outputted by the fourth device, when the first device comprises the third device and the fourth device, the information comprises the signal outputted by the third device and the signal outputted by the fourth device, and when the signal outputted by the third device and the signal outputted by the fourth device both show that a single staff member is present in the target area, the control device determines that a single staff member is present in the target area.

8. The method according to claim 6, wherein
the at least one sensing device is one sensing device, arranged so as to be only capable of sensing an activated transmitting unit located in the target area,
or
the at least one sensing device is multiple sensing devices arranged in the designated area.

9. An apparatus for safety control, comprising:
a determining module, for determining whether a single staff member is present in a target area and whether an activated transmitting unit, required to be carried by a staff member entering a designated area, is present in the target area; and
a control module, for allowing a staff member located in the target area to enter the designated area, when a determination result is positive.

10. The apparatus according to claim 9, wherein the determining module comprises:
a first module, for determining whether a single staff member is present in the target area on the basis of information capable of being used to determine whether a single staff member is present in the target area, the information coming from a first device; and
a second module, for determining whether the activated transmitting unit is present in the target area, using at least one sensing device for detecting whether the activated transmitting unit is present in the target area.

11. A control device, comprising:
a processor; and
a memory, storing an executable instruction which, when executed, causes the processor to execute an operation included in claim 5.

12. A machine-readable storage medium, having an executable instruction thereon; when the executable instruction is executed, a machine is caused to execute an operation included in claim 5.

13. The system according to claim 2, wherein the first device comprises a fourth device and the fourth device is used for acquiring data capable of indicating a number of staff present in the target area, and the fourth device outputs a signal containing the data,
wherein, the information comprises the signal outputted by the third device and the signal outputted by the fourth device, and when the signal outputted by the third device and the signal outputted by the fourth device both show that a single staff member is present in the target area, the control device determines that a single staff member is present in the target area.

14. The system according to claim 13, wherein the third device is a revolving door.

* * * * *